July 12, 1966 G. L. HEITER 3,260,852

FERRITE FREQUENCY CONVERTER WITH DIELECTRIC LOW PASS FILTER

Filed Jan. 3, 1963

INVENTOR,
GEORGE L. HEITER.

BY Harry M. Saragovitz

ATTORNEY.

United States Patent Office 3,260,852

Patented July 12, 1966

3,260,852
FERRITE FREQUENCY CONVERTER WITH DIELECTRIC LOW PASS FILTER

George Ludwig Heiter, Stanford, Calif., assignor to the United States of America as represented by the Secretary of the Army Filed Jan. 3, 1963, Ser. No. 249,302
4 Claims. (Cl. 307—88.3)

Figure 1:
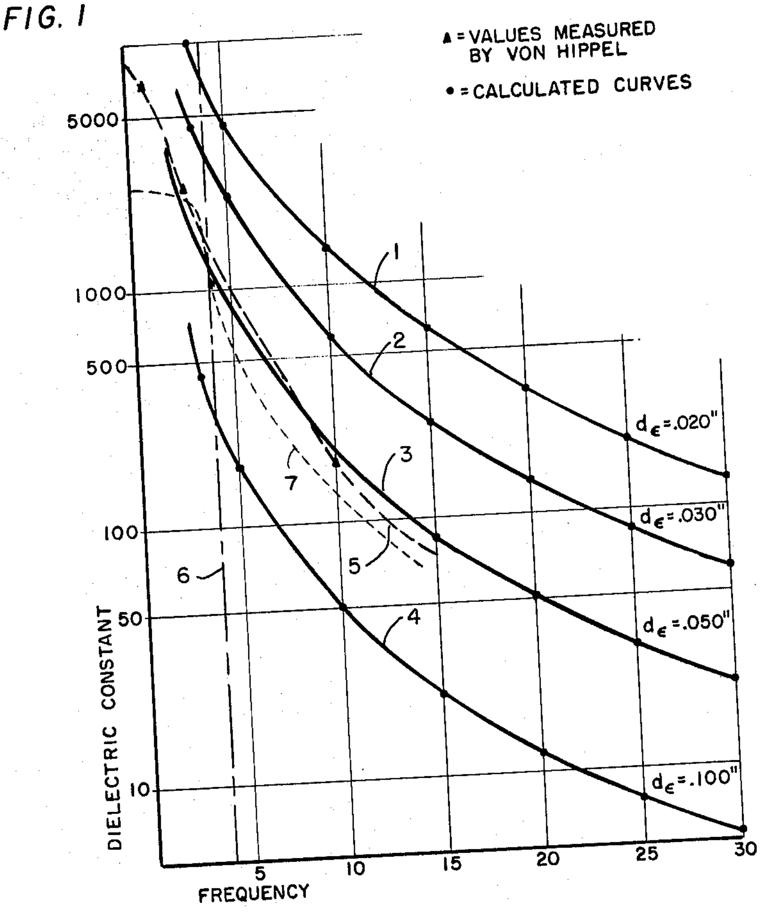

This invention relates to electromagnetic wave transmission systems and, more particularly, to dielectric low pass waveguide filters for use in such systems.

Waveguide filters have consisted of such reactive elements as irisis, probes and cavities critically positioned within the waveguide. Other attempts to provide filters for wave transmission systems have resulted in using non-waveguide elements such as transmission lines connected into the system. For many applications, the above filters have proved to be unsatisfactory since they do not possess adequate signal rejection at frequencies above the pass band. One such application having stringent requirements for a low pass filter, which must pass a given signal frequency but reject all frequencies above the given frequency, up to several times the given frequency, is the pulsed ferrite microwave generator.

It is therefore an object of this invention to provide a low pass waveguide filter with improved signal rejection characteristics.

A further and more specific object is to provide a dielectric low pass filter particularly adaptable to pulsed ferrite generators.

The operation of this invention is based on the fact that some dielectric materials have a dielectric constant which exhibits a nonlinear dependence upon frequency. Moreover, the dielectric constant of the material not only varies nonlinearly with frequency but does so to a degree greater than an inverse square law. The filter section consists of a length of circular waveguide filled with the nonlinear dielectric material. The dependence of dielectric constant upon frequency is sufficient to allow propagation of the desired input signals, while those signals whose frequencies are higher than the input signal frequency will not be propagated. At the higher frequencies the dielectric constant becomes sufficiently small to cut-off the waveguide. Barium titanates exhibit this nonlinear relationship between frequency and dielectric constant.

According to the results published by A. von Hippel in "Dielectric Materials and Applications," MIT, 1954, the relative dielectric constant, $\epsilon'$, of barium titanates changes from the order of 6,000 to 10,000 at low frequencies (up to about 2.5 kmc.) to the order of 10 to 100 at high frequencies (over 15 kmc.). These barium titanates contain 60 to 80 percent of BaO in either $TiO_2$ body or strontium titanate body.

It has been found that one of the important requirements for pulsed ferrite microwave generators is a low pass filter of special properties located between the input signal generator and the ferrite. Briefly, this filter must pass the input signal frequency, but should reject all frequencies above the input signal frequency up to and including the output frequency. That is to say, a low pass filter is required having no higher pass bands or other spurious responses over substantially a ten-to-one frequency range above its cutoff frequency. Filters with such characteristics are not ordinarily available. However, the filter of the present invention, which was designed specifically for application to the above mentioned microwave generators, possesses such characteristics.

The nature of the present invention along with various advantages, objects and features thereof will become more apparent upon consideration of the accompanying drawings and the following detailed description of those drawings.

Figure 2:
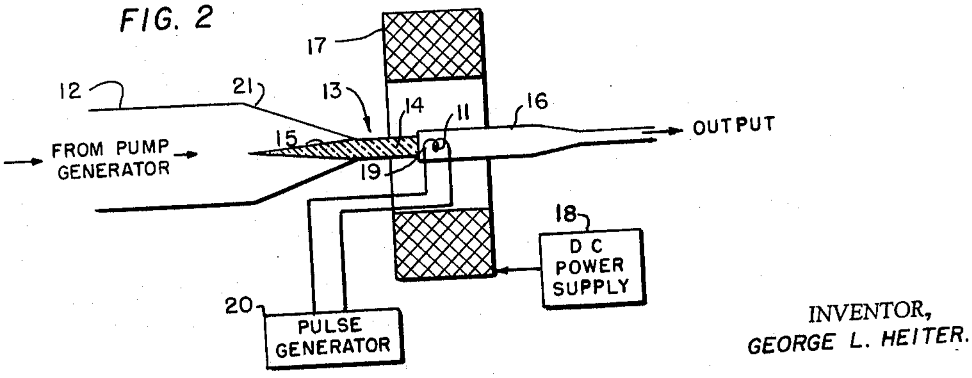

In the drawings:

FIG. 1 shows plots of dielectric constant vs. frequency for various waveguide diameters; and FIG. 2 shows the circuit embodying the novel filter in accordance with this invention.

Operation of the filter of this invention is based on the fact that certain dielectric materials have a dielectric constant which exhibits a nonlinear dependence upon frequency. The minimum required change of dielectric constant can be calculated easily from the cutoff wavelength $\lambda_c$ of the $TE_{11}$ circular waveguide mode by starting with the basic formula: $\lambda_c=3.41a$, where $a$ is the guide radius. When the guide is filled with dielectric, the guide diameter is reduced proportional to $1/\sqrt{\epsilon'}$ for the same cutoff frequency. Thus, the dielectric constant required for a given waveguide diameter and for a given cutoff frequency can be calculated from the equation:

$$\epsilon'=(d_0/d_\epsilon)2$$

where $d_\epsilon$ is the diameter of the dielectric filled waveguide and $d_0$ is the diameter of the unfilled waveguide. This is plotted in FIG. 1 as a function of frequency, curves 1 to 4 having different waveguide diameters as parameters. In the same figure the values obtained by inserting the dielectric constants as given by the above mentioned von Hippel paper are plotted as dashed curve 5.

For the purposes of this description it is assumed that the desired cutoff frequency is 4 kmc. If the dielectric constant of the material employed lies above the calculated values for frequencies under the 4 kmc. line 6, and if it lies below the values for all higher frequencies, then the required feature is obtained. The curve of such material is shown in FIG. 1 as curve 7. It should be noted that the material must have a dielectric constant that not only varies nonlinearly with frequency but does so to a degree greater than an inverse square law so that the cross-over of curve 7 relative to curve 3 occurs at the desired frequency (4 kmc. in this particular example).

The circuit embodying the novel filter of this invention will now be described, reference being made to FIG. 2. A pump signal is coupled to a ferrite sphere 11 by means of a circular waveguide 12 and a dielectric waveguide filter 13. Output signals are extracted from the ferrite sphere 11 by means of a circular waveguide 16. The dimensions of guides 12 and 16 are determined by the frequency of the input and output signals respectively. A continuous D.C. field is applied to ferrite 11 by means of a coil 17 which is energized by a D.C. power supply 18. A pulsed D.C. field is applied to the ferrite by means of a single loop coil 19 which is energized by a pulse generator 20.

The filter 13 functions as a low pass filter permitting the signal from the pump generator to reach the ferrite but preventing the output signal from reaching waveguide 12. The circular guide 12 is tapered down at 21 to a relatively narrow diameter at the filter section 13. The inserted ceramic material 14 is tapered in the transition region to such a shape that the square law equation is obeyed.

The operation of the circuit shown in FIG. 2 is now considered. The pump signal is coupled to ferrite 11 and the continuous D.C. field applied by coil 17 is adjusted for resonance of the spin system of the ferrite 11 at the pump frequency. A pulsed D.C. field is then applied to ferrite 11 and the energy stored in the spin system is extracted by output guide 16. The frequency of the output signal is determined by the combined strength of the continuous and pulsed fields, the output frequency being higher than the pump frequency. The operation of the filter section is such that the pump frequency power fringes into waveguide 16 to excite ferrite resonance, but for the high frequency output signal, the filter section 13 is below cutoff and thus cannot propagate it.

It is to be understood that the above described arrangements are illustrative of the application and principles of the invention. Numerous other arrangements may be devised by those skilled in the art without departing from the spirit and scope of the invention.

What is claimed is:

1. A signal generator comprising a first waveguide, a ferrite sphere positioned within said first waveguide, a second pump frequency waveguide having a cross-sectional area greater than that of said first waveguide, a waveguide filter positioned between said first and second waveguides for passing said pump frequency signal but rejecting all frequencies above said pump frequency, said waveguide filter containing a dielectric material having a dielectric constant which varies nonlinearly with respect to frequency over the desired frequency range, to an extent greater than an inverse square root law, and output waveguide means connected to said first waveguide for extracting from said ferrite a signal of a frequency higher than said pump frequency.

2. A signal generator as set forth in claim 1 having means for applying a D.C. magnetic field to said ferrite, and means for applying a pulsed magnetic field to said ferrite.

3. A signal generator comprising: a first circular waveguide, a ferrite sphere positioned within said first waveguide, a second circular pump frequency waveguide having a diameter greater than that of said first waveguide, a circular waveguide filter of smaller diameter than said first waveguide connected to said first waveguide, a tapered waveguide section connecting said second waveguide, and said filter waveguide, a dielectric rod positioned within said filter waveguide and extending into said tapered waveguide section, the end of said rod which extends into said tapered waveguide section being tapered, and the dielectric constant of said rod material varying nonlinearly with frequency over the desired frequency range, to an extent greater than an inverse square root law.

4. A generator as set forth in claim 3 having means for applying a D.C. magnetic field to said ferrite and means for applying a pulsed magnetic field to said ferrite.

No references cited.

ROY LAKE, *Primary Examiner.*

D. M. HOSTETTER, *Assistant Examiner.*